(12) United States Patent
Menke

(10) Patent No.: US 11,025,067 B2
(45) Date of Patent: Jun. 1, 2021

(54) GRID ISOLATING WIND FARM CONTROL

(71) Applicant: GENERAL ELECTRIC COMPANY, Schenectady, NY (US)

(72) Inventor: Detlef Menke, Salzbergen (DE)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 16/224,866

(22) Filed: Dec. 19, 2018

(65) Prior Publication Data

US 2019/0190275 A1   Jun. 20, 2019

(30) Foreign Application Priority Data

Dec. 20, 2017   (EP) .................... 17208933

(51) Int. Cl.
*H02J 3/38* (2006.01)
*H02J 3/40* (2006.01)
*F03D 7/00* (2006.01)
*H02J 3/08* (2006.01)
*H02J 13/00* (2006.01)

(52) U.S. Cl.
CPC ............. *H02J 3/386* (2013.01); *F03D 7/00* (2013.01); *H02J 3/40* (2013.01); *H02J 13/0017* (2013.01); *F05B 2270/337* (2013.01); *H02J 3/08* (2013.01); *H02J 3/388* (2020.01)

(58) Field of Classification Search
CPC .......... H02J 3/386; H02J 3/40; H02J 13/0017; H02J 3/388; H02J 3/08; H02J 13/00006; H02J 13/00034; H02J 13/00017; H02J 3/381; H02J 2300/28; F03D 7/00; F05B 2270/337; Y02E 40/70; Y02E 10/76; Y02E 10/72; Y04S 10/123; Y04S 40/124
See application file for complete search history.

(56) References Cited

U.S. PATENT DOCUMENTS 8,853,877 B1 * 10/2014 Zalar ................ F03D 7/048
                                                    290/44
9,660,451 B1    5/2017 Naiknaware
2005/0201408 A1 * 9/2005 Otani ................ G05B 19/042
                                                    370/438

(Continued)

FOREIGN PATENT DOCUMENTS

EP       1909371 A2    4/2008
WO    WO2017092769 A1    6/2017
WO       2017167784 A1   10/2017

OTHER PUBLICATIONS

EP Search Report issued in connection with corresponding Application No. EP 17208933.6 dated Feb. 21, 2018.

*Primary Examiner* — Thomas C Lee
*Assistant Examiner* — Anzuman Sharmin
(74) *Attorney, Agent, or Firm* — Dority & Manning, P.A.

(57) ABSTRACT

Disclosed is a method of controlling wind turbines of a wind farm, each connected to a wind farm grid, in case of a disconnect from a main grid. During the disconnect from the main grid, at least one demand value is transmitted from a digital master grid controller to respective converter units of the wind turbines via a digital data link such that the converter units receive the at least one demand value substantially simultaneously and are operable to keep the wind turbines online and synchronised to the wind farm grid during the disconnect from the main grid.

13 Claims, 3 Drawing Sheets

(56) References Cited

U.S. PATENT DOCUMENTS

| | | | |
|---|---|---|---|
| 2007/0162609 A1* | 7/2007 | Pope | H04L 1/007 |
| | | | 709/230 |
| 2012/0261917 A1* | 10/2012 | Egedal | F03D 9/257 |
| | | | 290/44 |
| 2012/0271475 A1* | 10/2012 | Wang | H02J 13/00002 |
| | | | 700/295 |
| 2013/0334872 A1* | 12/2013 | Kodama | H02J 3/381 |
| | | | 307/1 |
| 2014/0188689 A1* | 7/2014 | Kalsi | G06Q 50/06 |
| | | | 705/37 |
| 2015/0042092 A1 | 2/2015 | Nelson et al. | |
| 2017/0284369 A1 | 10/2017 | Chen et al. | |

* cited by examiner

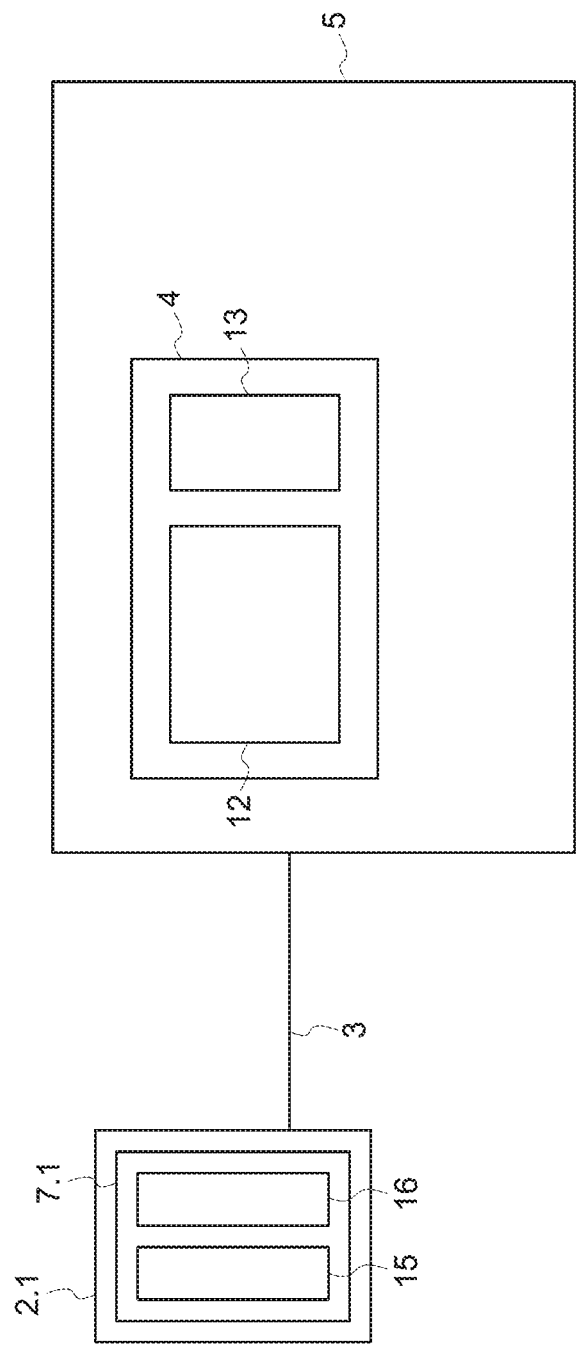

GRID ISOLATING WIND FARM CONTROL

FIELD OF THE INVENTION

The present disclosure relates generally to the control of wind turbines in a wind farms. Particularly, the disclosure relates to the control of wind turbines connected to a wind farm grid during a disconnect of the wind farm grid from a main grid (and subsequent reconnect to the main grid).

BACKGROUND OF THE INVENTION

Wind turbines are connected individually and in small groups to the medium voltage distribution network or in large wind farms to the high voltage distribution and transmission network. The connection rules and performance required by the power system operator depend on the size of the wind farms and the voltage of the main grid to which they are connected.

Individual wind turbines and small wind farms connected to a wind farm grid must comply with regulations in order to be connected to the main grid. The philosophy of these regulations is that the power generation is too small to have any significant impact on the frequency of the main grid. Thus, these regulations require that the wind farm grid is disconnected from the main grid if there is any disturbance in the main grid system. When the network voltage or frequency is outside the normal operating range, the turbines are tripped and not reconnected until normal network conditions are restored in the main grid.

During normal operation, when the wind farm grid is connected to the main grid, the wind turbines are able to determine demand values (voltage, phase, frequency) at their transformers. However, as soon as they the wind farm grid is disconnected from the main grid due to a grid disturbance, this is not possible anymore and the wind turbines are in an uncontrolled/instable state and consequently disconnect in turn from their wind farm grid. Internal consumers in the wind farm grid cannot be supplied anymore. When the main grid recovers, the wind turbines in the wind farm grid need to startup and go online again. This could take more than a minute. Embodiments of the present invention address this problem. It allows to disconnect the wind farm grid from the main grid without that the wind turbines have to go offline (disconnect from their wind farm grid) and enables a fast reconnection of the wind farm grid to the main grid in case of recovery of the main grid.

SUMMARY OF THE INVENTION

Embodiments of the invention are defined by the independent claims. Certain embodiments commensurate in scope with the originally claimed embodiments of the invention are summarised below. These embodiments are not intended to limit the scope of the claimed embodiments of the invention, but rather these embodiments are intended only to provide a brief summary of possible forms of embodiments of the invention. Indeed, the embodiments of the invention may encompass a variety of forms that may be similar or different from the embodiments set forth below.

In an embodiment of the invention resides in a method of controlling wind turbines of a wind farm, each connected to a wind farm grid, in case of a disconnect from a main grid. During the disconnect from the main grid, at least one demand value is transmitted from a digital master grid controller to respective converter units of the wind turbines via a digital data link such that the converter units receive the at least one demand value substantially simultaneously and are operable to keep the wind turbines online and synchronised to the wind farm grid during the disconnect from the main grid.

In another embodiment of the invention resides in one or more computer-readable media comprising computer executable instructions stored thereon which, when executed by one or more processors, cause the one or more processors to perform the method of described under the first aspect.

In another embodiment of the invention resides in a digital master grid controller programmed to control wind turbines of a wind farm, each connected to a windfarm grid, in case of a disconnect from a main grid. During disconnect from a main grid, at least one demand value is transmitted from the digital master grid controller to respective converter units of the wind turbines via a digital data link such that the converter units receive the at least one demand value substantially simultaneously and are operable to keep the wind turbines online and synchronised to the wind farm grid during the disconnect from the main grid.

In another embodiment of the invention resides in a method of controlling wind turbines of a wind farm, each connected to a wind farm grid, in case of a disconnect from a main grid. The method comprises transmitting at least one demand value from a digital master grid controller to respective converter units of the wind turbines via a digital data link; receiving the at least one demand value substantially simultaneously at the respective converter units; and using the at least one demand value at the respective converter units to keep the wind turbines online and synchronised to the wind farm grid during the disconnect from the main grid.

BRIEF DESCRIPTION OF THE DRAWINGS

FIG. 3 shows hardware and software components which perform a method of controlling wind turbines of a wind farm grid during a disconnect of the wind farm grid from the main grid.

DETAILED DESCRIPTION

Figure 1:
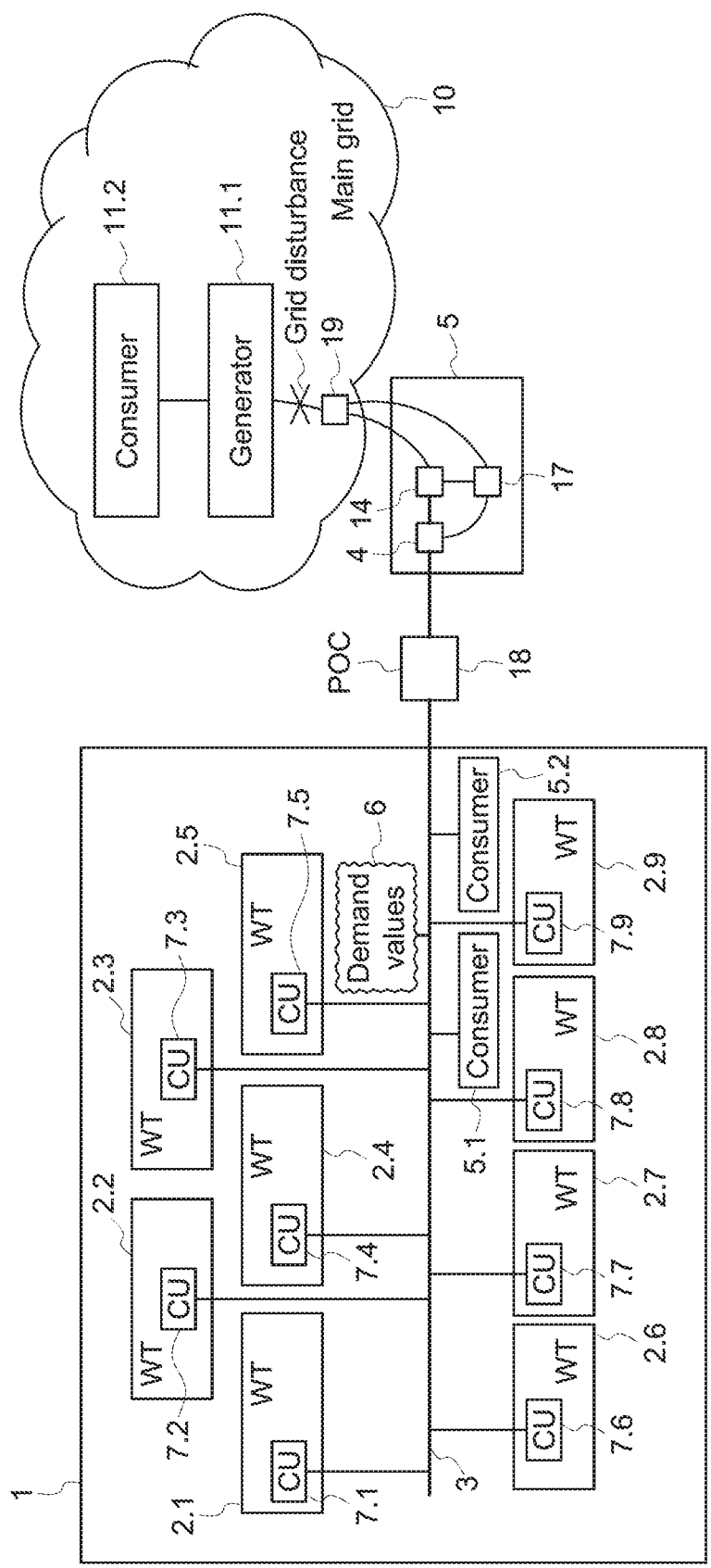
FIG. 1 shows a wind farm grid connected to a main grid.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Reference will now be made in detail to the various embodiments, one or more example of which are illustrated in the figures. Each example is provided by way of explanation and is not meant as a limitation. For example, features illustrated or described as part of one embodiment FIG. 1 shows a system comprising a wind farm grid 1 connected to a main grid 10, including a generator 11.1 and a consumer 11.2, in which embodiments of the present invention may be performed. Before continuing with the description of FIG. 1, a few items of embodiments of the invention will be discussed.

A method is provided of controlling wind turbines of a wind farm, each connected to a wind farm grid, in case of a disconnect from a main grid. During the disconnect from the main grid, transmitting at least one demand value from a digital master grid controller to respective converter units of the wind turbines via a digital data link such that the converter units receive the at least one demand value substantially simultaneously and are operable to keep the wind turbines online and synchronised to the wind farm grid during the disconnect from the main grid.

In some of the embodiments, the wind farm grid is part of a larger grid and the method is directed to controlling the wind turbines within the (partial) wind farm grid. In some of the embodiments, the partial wind farm grid is electrically separable from the rest of the larger grid.

In some of the embodiments, the digital master grid controller broadcasts the one or more demand values to the respective converter units of the wind turbines.

In some of the embodiments, the digital data link is a power line communication (PLC) link. Power line communication is a communication technology that uses power cables to simultaneously carry both data and electric power. The power line is transformed into a data line via the superposition of an information signal to the power wave. It is ensured that the electricity and the power wave do not interfere with the data signal. PLC allows that with just power cables running to a wind turbine one can both receive power from the wind turbine and at the same time control the wind turbine.

In other embodiments, the digital data link is a separate data link. In some of these embodiments the separate data link is a high speed synchronous IO bus to which the digital master grid controller and the converter units of the wind turbines are connected. In some of the embodiments, the digital data link is, in an embodiment, a fast data link that can be operated at least 10 kHz, in an embodiment, at least 100 kHz.

In some of the embodiments, the communication between the digital master controller and the wind turbines is based on redundancy. The communication network shall always guarantee proper function against a single point of failure. In some of the embodiments, some networking devices such as switches or routers are duplicated.

In some of the embodiments, the digital data link is based on an error detection data transmission protocol or an error correcting data transmission protocol. This ensures that the data link is both fast and has built in redundancy encoding to ensure reliability. Error detection and error correction are techniques that enable reliable delivery of digital data over unreliable communication channels. Error detection comprises techniques such as repetition codes, parity bits, checksums and cyclic redundancy checks while error correction comprise error correcting codes.

In some of the embodiments, the communication between the digital master grid controller and the converter units of the wind turbines is based on international standard IEC 61400-25 ("Communications for monitoring and control of wind power plants") which provides uniform information exchange for monitoring and control of wind power plants. In some of the embodiments, the wind turbine farms communication infrastructure is a switch-based architecture, where each wind turbine is equipped with an industrial Ethernet switch (ESW) at the base of the tower, and optical fiber cables are used to connect between wind towers. Considering the IEC 61400-25 standard, wind turbine generated data is classified into three different categories: analogue measurements (AM), status information (SI), and protection and control information (PCI). The demand values belong to the PCI category. Based on the turbine manufacturer, a proprietary protocol is used to transmit the demand values.

In some of the embodiments, the control of the wind turbines via the master grid controller is based on a SCADA (Supervisory Control and Data Acquisition) architecture. The SCADA concept was developed as a universal means of remote access to a variety of local control modules. The design of the wind farm SCADA system and the communication infrastructure is performed with consideration to overall system resilience to ensure the highest level of availability for the SCADA system and associated control and protection equipment.

In some of the embodiments, the communication network is a self-healing network. The communication network shall be resilient to failures and shall be characterized by fast recovery time.

In the context of embodiments of the present invention, QoS is one of the important parameters to evaluate communication network connecting the wind turbines with the digital master grid controller. It defines the network characteristic such as bandwidth, latency, packet loss. It is critical to select the best communication network protocols inside the wind turbine in order to maintain the real time data transmission in the system and also to meet the requirement of industrial application.

In some of the embodiments, the communication technology used is PON (passive optical networks), EPON (Ethernet passive optical network), WDM (wavelength division multiplexing), SONET (synchronous optical network) or SDH (synchronous digital hierarchy) which are based on fiber optics.

In some the embodiments, the demand values comprise frequency demand, phase demand and voltage demand. During disconnect of the wind farm grid from the main grid, the digital master grid controller takes the lead and provides these demand to the converter units of the wind turbines which are not able to measure these values anymore due to the disconnect. The provision of the demand values by the digital master grid controller ensures that the wind turbines do not switch off and disconnect from the wind farm grid (stay online) but continue to stay online and operate in a synchronised way. This further ensures that the internal wind farm consumers continue to be supplied with power. In other words, the wind farm grid is transferred into an operational and stable standby state until the main grid recovers and the wind farm grid can be connected to the main grid again.

During normal operation, i.e. before the wind farm grid had to be disconnected from the main grid, the demand values required by the main grid are measured by the converter unit of the wind turbines.

In some of the embodiments, it is detected that the main grid is not available and consequently, the wind farm grid is disconnected from the main grid.

In some of the embodiments, the digital master grid controller is located at a substation connected between the main grid and the wind farm grid while in other embodiments the digital master grid controller is located at one of the wind turbines.

In some of the embodiments the wind turbines are available for power production during the disconnect from the main grid.

In some of the embodiments, since the demand values transmitted by the digital master grid controller allow the frequency and phase within the wind farm grid to be synchronised during the disconnect from the main grid. In some of the embodiments, the demand values are received substantially simultaneously at the converter units of the wind turbines. In some of the embodiments, the demand values are received with a jitter of less than 10 μsec.

In some of the embodiments, the demand values allow to keep the wind turbines at maximum allowed possible speed during the disconnect from the main grid.

In some of the embodiments, a recovery of the main grid is detected. One or more demand values of the main grid are supplied to the digital master grid controller which transmits them to the converter units to synchronise frequency and phase of the wind farm grid with the frequency and phase of the main grid. As soon as the frequencies and phases are synchronized, the wind farm grid can be reconnected with the main grid. In this case, the converter units are able to measure the demand values again and the digital master grid controller discontinues to transmit the demand values to the converter units.

In some of the embodiments, Phase locked loop (PLL) algorithms are used for synchronizing the wind farm grid with the main grid.

In some of the embodiments, once the wind farm grid is connected to the main grid again, power production of the wind turbines can be increased by pitching the rotor blades in an optimal position against the wind direction.

Returning now to FIG. 1, which shows nine wind turbines 2.1-2.9 each connected to the wind farm grid 1 (which may be part of a larger grid (not shown)). Two internal wind farm consumers 5.1, 5.2 are shown which are also connected to the wind farm grid 1 and the internal consumers 5.1, 5.2 are supplied with energy by the wind turbines 2.1-2.9. In the shown example, the wind farm grid 1 is PLC (power line communication) controlled which means that each wind turbine 2.1-2.9 has a converter unit 7.1-7.9 which are connected via a high speed synchronous IO bus 3 (which is part of the electric cable system of the wind farm grid 1). In other examples (not shown) a separate data link, e.g. based on an optical fiber network, can be used for data communication. During normal operation and as long as the wind farm grid 1 is connected with the main grid 10, the converter units 7.1-7.9 measure voltage, phase and frequency and follow these. A grid disturbance is indicated in FIG. 1 by a fault occurring on the transmission line between substation 5 and generator 11.1. The substation 5 further includes a detector module 17 which is connected to a sensor 19 located within the main grid 10 in order to detect such a grid disturbance. A grid disturbance is detected if the main grid 10 is completely unavailable, possibly for a prolonged period of time or if the main grid 10 is unstable. The detector module 17 sends the occurrence of a grid disturbance to a digital master grid controller 4 in the substation 5, which connects the wind farm grid 1 with the main grid 10 via a point of connection (POC) 18, and to a circuit breaker 14 which now opens to disconnect the wind farm grid 1 from the main grid 10. As soon as the wind farm grid 1 is isolated from the main grid 10, the converter units 7.1-7.9 do not know how to operate since they cannot do measurements anymore. In such a case, the wind turbines 2.1-2.9 would normally go offline from the wind farm grid 1 and shut down. To avoid this situation, the digital master grid controller 4 starts broadcasting (predetermined) demand values 6 (voltage, phase and frequency) via the bus 3 to the converter units 7.1-7.9 to keep the wind turbines 2.1-2.9 operational. The converter units 7.1-7.9 receive the demand values 6 all at substantially the same time and are able to follow these demand values 6. The converter units 7.1-7.9 use the demand values for their internal control which means that the wind turbines 2.1-2.9 can remain online and continue to produce power. Hence, despite the isolation from the main grid 10, the wind farm grid 1 is transferred into a stable standby state and all wind turbines 2.1-2.9 operate in a synchronised manner which means that the frequency and phase inside the wind farm grid 1 is synchronized. The internal wind farm consumers 5.1 and 5.2 are still supplied with energy. The converter units 7.1-7.9 may include any piece or pieces of hardware or software, such as computers and computer programs, to control the output (e.g. frequency, phase) of each wind turbine 2.1-2.9. The demand values are transmitted with more than 1 kHz via the power line communication and each converter unit 7.1-7.9 receives the demand values 6 within a jitter (deviation) of 10 μs.

Once the sensor 19 send data to the detector module 17 that indicate that the main grid 10 has recovered, the demand values of the main grid 10 are provided to the digital grid controller 4 which broadcasts them to converter units 7.1-7.9 of the wind turbines 2.1-2.9 which enable a synchronization of the wind farm grid 1 with the main grid 10 in short time. For example, a phase locked loop algorithm may be used for the synchronization and finally, the circuit breaker 14 can be closed again such that the wind farm grid 1 and the main grid 10 are connected again. The power production of the wind turbines 2.1-2.9 can be increased in case the windfarm frequency is synchronized with the grid for example by pitching the rotor blades in an optimal direction against the wind direction. The increase rate depends on the wind farm configuration and the available windfarm power.

Figure 2:
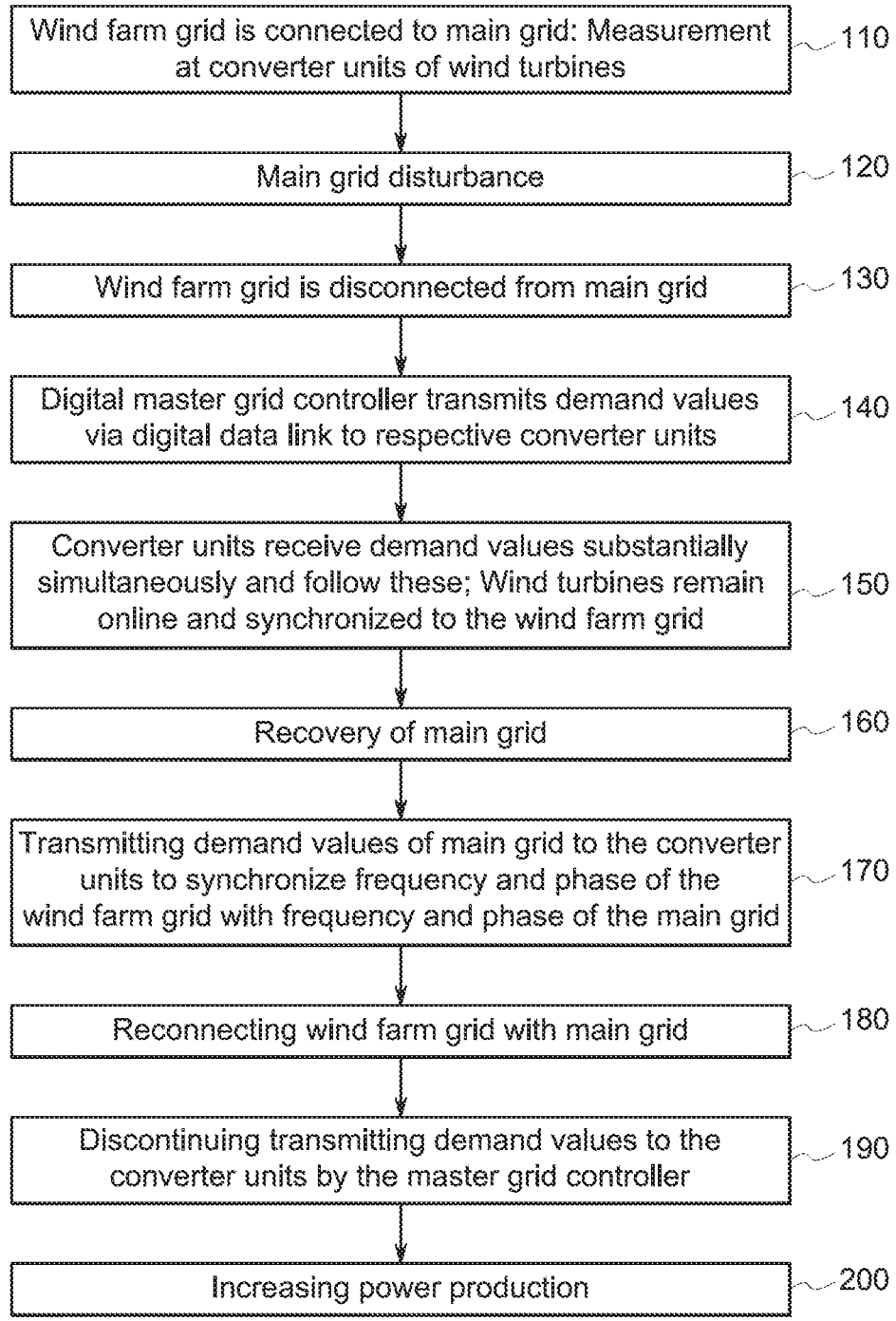
FIG. 2 shows a flowchart of a method of controlling wind turbines of a wind farm in case of a disconnect of a wind farm grid from a main grid and subsequent reconnect.

FIG. 2 shows a method of controlling a wind farm grid during a disconnect from the main grid and subsequent reconnect to the main grid. At 110, the wind farm grid is connected to the main grid. Phase, voltage and frequency is measured at the converter units of the wind turbines to keep the wind farm grid in line with the main grid. At 120, a disturbance in the main grid is detected. At 130, the wind farm grid is disconnected from the main grid in response to the detection of the disturbance in the main grid. At 140, a digital master grid controller transmits one or more demand values via a digital data link to the respective converter units of the wind turbines. At 150, the converter units receive the demand values substantially simultaneously and follow these. The wind turbines remain online and synchronised to the wind farm grid. At 160, a recovery of the main grid is detected. At 170, demand values of the main grid are transmitted by the digital master grid to the converter units of the wind turbines to synchronise the frequency and phase of the wind farm grid with the frequency and phase of the main grid. Once the two grids are synchronised, the wind farm grid is reconnected to the main grid at 180. At 190, the digital master grid controller discontinues transmitting demand values and the converter units can operate based on their measurements again. At 200, the power production can be increased.

FIG. 3 shows the substation 5 at which is located the digital master grid controller 4 which comprises a computer-readable medium 12 and a processor 13. The substation 5 is connected via high speed synchronous IO bus 3 with wind turbine 2.1 (and other wind turbines which are not shown) which comprises the converter unit 7.1. The converter unit 7.1 also has a computer-readable medium 15 and a processor 16. The digital master grid controller 4 is able to send demand values to the converter unit 7.1 via the high speed synchronous IO bus 3. The converter unit 7.1 follows the demand values received from the digital master controller 4 located at the substation 5. The digital master grid controller 4 (and the converter unit 7.1) perform the methods according to embodiments of the invention.

The approach presented herein is a digital data based approach since it is based on the transmission of demand values (as instructions from a digital master grid controller to the converter units of the wind turbines) instead of measurements. The demand values tell the converter units how to behave in case of a disconnect from the main grid. The advantage is that during a disconnect from a main grid the wind turbines connected to a wind farm grid can stay online, can supply internal wind farm consumers with energy and are directly available for power production. The wind turbines do not go from the wind farm grid and do not have to shut down. In case of grid recovery, the wind farm grid can quickly be reconnected to the main grid again and power production can be increased.

Embodiments of the present invention may be embodied as a method, digital master grid controller, or computer readable medium. Accordingly, embodiments of the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, embodiments of the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of embodiments of the present invention may be written in an object oriented programming language such as Java7, Smalltalk or C++, or the like. However, the computer program code for carrying out operations of embodiments of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Embodiments of the present invention were described above with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory. These instructions can direct a computer or other programmable data processing apparatus to function in a particular manner. The such that the instructions stored in the computer-readable memory produce an article of manufacture including instruction means which implement the function/act specified in the flowchart and/or block diagram block or blocks. The computer program instructions may also be loaded onto a computer or other programmable data processing apparatus. These instructions may cause a series of operational steps to be performed on the computer or other programmable apparatus to produce a computer implemented process. Here, the instructions, which execute on the computer or other programmable apparatus, provide steps for implementing the functions/acts specified in the flowchart and/or block diagram blocks.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling wind turbines of a wind farm, each of the wind turbines being connected to a wind farm grid, in case of a disconnect from a main grid, the method comprising:

during the disconnect from the main grid, transmitting by broadcast a plurality of demand values from a digital master grid controller to respective converter units of the wind turbines via a digital data link such that each of the respective converter units receive the plurality of demand values simultaneously and are operable to maintain the wind turbines online and synchronized to the wind farm grid during the disconnect from the main grid, wherein the plurality of demand values comprise a frequency demand, a phase demand, and a voltage demand, detecting a recovery of the main grid;

transmitting at least one demand value of the main grid to the converter units to synchronize frequency and phase of the wind farm grid with the frequency and phase of the main grid;

reconnecting the wind farm grid with the main grid; and discontinuing transmitting of the plurality of demand values to the converter units by the master grid controller.

2. The method of claim 1, wherein the digital data link is a power line communication, PLC, link or a separate data link.

3. The method of claim 2, wherein the separate data link is a high speed synchronous IO bus to which the digital master grid controller and the converter units of the wind turbines are connected.

4. The method of claim 1, wherein the digital data link is based on an error correcting data transmission protocol.

5. The method of claim 1, wherein before the disconnect from the main grid, the plurality of demand values required by the main grid is measured by the converter units of the wind turbines.

6. The method of claim 5, further comprising detecting that the main grid is not available and disconnecting the wind farm grid from the main grid.

7. The method of claim 1, wherein the digital master grid controller is located at a substation or at one of the wind turbines in the wind farm grid.

8. The method of claim 1, wherein the wind turbines are available for power production during the disconnect from the main grid.

9. The method of claim 1, wherein the plurality of demand values transmitted by the digital master grid controller guarantees a supply of internal wind farm consumers during the disconnect from the main grid.

10. The method of claim 1, wherein the plurality of demand values transmitted by the digital master grid controller allows the frequency and phase within the wind farm grid to be synchronized during the disconnect from the main grid.

11. The method of claim 1, wherein the plurality of demand values allows for maintaining the wind turbines at maximum allowed possible speed during the disconnect from the main grid.

12. One or more non-transitory computer-readable media comprising computer executable instructions stored thereon which, when executed by one or more processors, cause the one or more processors to perform the method of claim 1.

13. A digital master grid controller programmed to control wind turbines of a wind farm, each connected to a windfarm grid, in case of a disconnect from a main grid, the digital master grid controller configured to implement a plurality of operations, the plurality of operations comprising:

during disconnect from a main grid, transmitting by broadcast a plurality of demand values from the digital master grid controller to respective converter units of the wind turbines via a digital data link such that each of the respective converter units receive the plurality of demand values simultaneously and are operable to maintain the wind turbines online and synchronized to the wind farm grid during the disconnect from the main grid, wherein the plurality of demand values comprise a frequency demand, a phase demand, and a voltage demand, detecting a recovery of the main grid;

transmitting at least one demand value of the main grid to the converter units to synchronize frequency and phase of the wind farm grid with the frequency and phase of the main grid;

reconnecting the wind farm grid with the main grid; and discontinuing transmitting of the plurality of demand values to the converter units by the master grid controller.

* * * * *